Harry R. Espey
Benjamin F. Ehrlich INVENTORS

BY John B. Davidson
ATTORNEY

United States Patent Office 3,462,665
Patented Aug. 19, 1969

3,462,665
MAINTAINING SPACIAL ALIGNMENT BETWEEN ROTATIVELY DRIVEN MEMBERS
Harry R. Espey and Benjamin F. Ehrlich, Houston, Tex., assignors to Esso Production Research Company, a corporation of Delaware
Filed Apr. 4, 1967, Ser. No. 628,457
Int. Cl. H02p 5/46
U.S. Cl. 318—85                                    6 Claims

ABSTRACT OF THE DISCLOSURE

Two rotatable members driven from the same prime mover, one directly and the other through a differential coupling, are placed in desired spatial alignment by detecting the deviation from the desired spatial alignment, producing a signal indicative of the deviation, and adjusting the differential coupling in accordance with the signal.

Background of the invention

This invention relates to producing and maintaining a desired spacial alignment between two members that are rotatively driven from a common prime mover, and more particularly to apparatus for adjusting the relative spacial alignment between a reproducing drum and a recording drum of a seismic recorder and maintaining such alignment during repeated cycles of operation of the apparatus.

There are a number of applications in industry wherein two members are rotatively driven from the same prime mover and wherein a given spacial alignment therebetween must be produced and maintained. For example, in the art of seismic prospecting it is customary to transcribe multitrace seismograms in reproducible form and thereafter to reproduce the seismogram and re-record the reproduced signals on another recording drum after various corrections have been applied thereto or after the signals have been operated on, as by filtering. The various traces of the seismogram are either reproduced simultaneously or on a trace sequential basis. At times it is desired to stop the apparatus to vary the corrections or to replace the records being transcribed, and to maintain the reproducing drum and the recording drum in the same spacial relationship. Various attempts to achieve this end in the past usually have been unsatisfactory. For example, attempts have been made to drive the recording drum and the reproducing drum from different synchronous motors activated from the same power source. While the drums can be maintained in step as long as the motors are energized, after the motors have been stopped, it is almost impossible to again get the drums in the same relative spacial alignment.

Summary of the invention

In accordance with one aspect of the invention, two rotatively driven members are driven from the same prime mover, one of the members being directly connected to the prime mover and the other being connected through a differential coupling having an input shaft such that the rotational speed of the coupling output is the sum of the speeds of the prime mover and of the input shaft. First and second means are connected to the two driven members, respectively, each adapted to produce a pulse at a given spacial position of the driven member connected thereto. Third means connected to the input shaft and to the first and second driven members is provided for repositioning the shaft responsive to variations of a time interval between the pulses from a given preselected time interval so that the pulses are brought into said given time relationship. The latter means may be a stepping motor connected to the shaft and an actuating means connected to the first and second means for turning the motor in a direction and through an angle to produce a given time relationship between the pulses.

Objects and features of the invention not apparent from the above discussion will become evident upon consideration of the following detailed description thereof taken in connection with the accompanying drawing.

Description of the preferred embodiment

Figure 1:
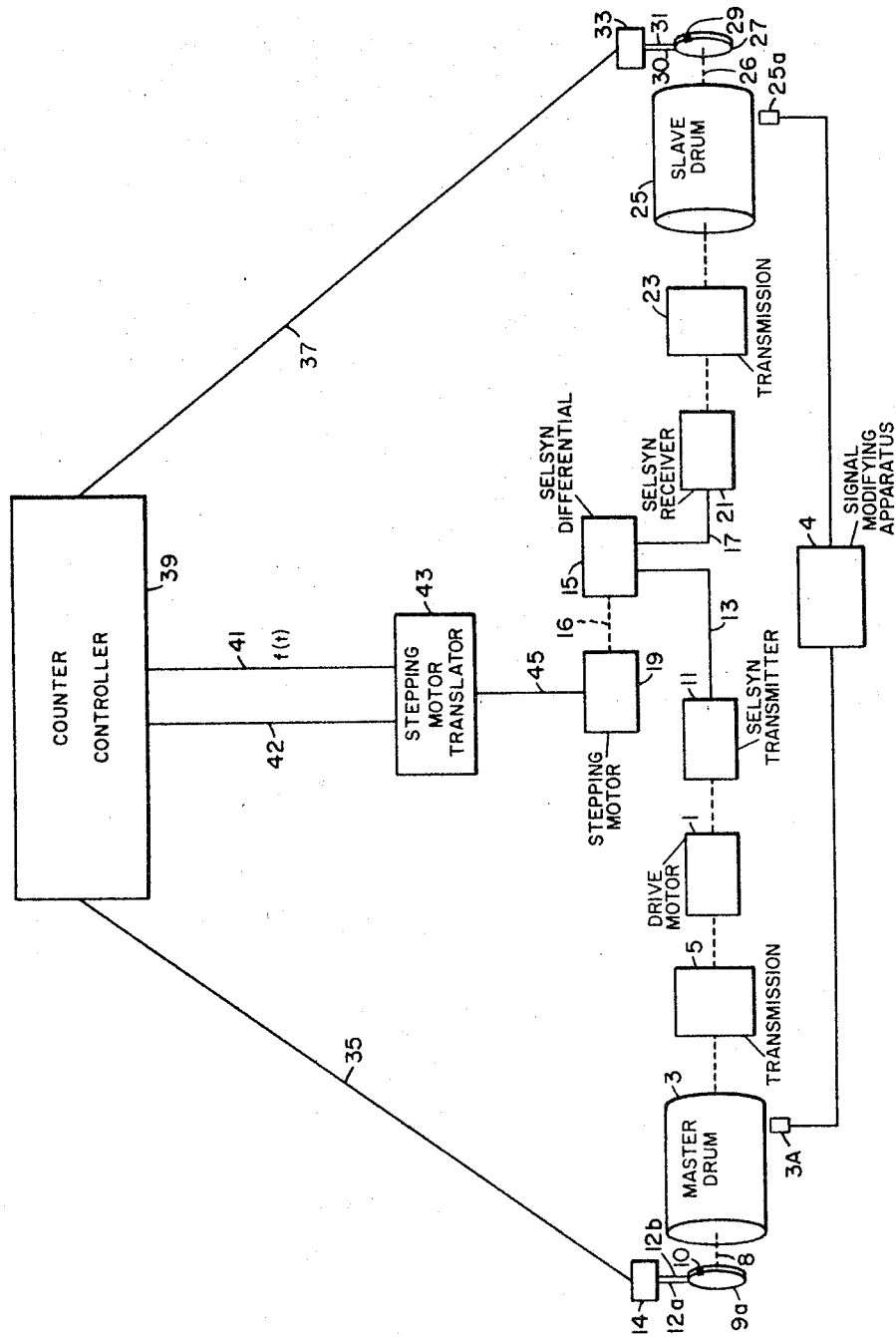
FIG. 1 is a schematic diagram of a preferred embodiment of the invention.

With reference now to FIG. 1, there is illustrated a preferred embodiment of the invention designed particularly for use with a seismic playback system. An electrical drive motor 1 is illustrated as being connected to a master recording or playback drum 3, on which is transported a seismic section previously recorded in reproducible form. For example, the seismic section may be recorded on photographic film or, as is more conventional, on magnetic tape. A playback head 3A in close proximity to the drum 3 reproduces the traces on the seismogram as electrical signals. The signals are transmitted through suitable amplifying, filtering, and other signal modifying apparatus 4 to a recording head 25A in close proximity to a slave or recording drum 25 for recording the electrical signals transmitted thereto. For the purpose of detecting the relative spacial alignments of drums 3 and 25, there is provided a pair of discs 9A and 27 which are respectively driven by the drums 3 and 25 through shafts 8 and 26. The discs are constructed of an electrically insulative material and have small conductive segments 10 and 29 embedded in the outer periphery thereof. Each disc has a pair of spring-biased, electrically conductive feelers associated therewith which are periodically electrically connected together by the conductive segment in the periphery of the disc. Feelers 12A and 12B are connected together by segment 10, and feelers 30 and 31 are connected together by segment 29. The feelers are connected to amplifiers 14 and 33 so that an output pulse is produced on lines 35 and 37 whenever the feelers are electrically connected together. Thus, at a given rotational position on each of the drums, an output pulse will be produced on one of lines 35 and 37 associated therewith.

The drive motor 1 is connected to the slave drum 25 through a selsyn differential 15, a selsyn receiver 21, and a mechanical transmission 23. The selsyn transmitter 11 is connected to the differential 15 through line 13, the differential 15 having an input shaft 16 and being connected to the selsyn receiver 21. The selsyn receiver 21 will be driven by the differential 15 at a speed equal to the vector sum of the speed at which selsyn transmitter 11 is driven by motor 1 and the speed at which the differential is driven by shaft 16. When the shaft 16 is rotated in one direction, the output speed of receiver 21 will be equal to the sum of the selsyn transmitter speed and the shaft speed of shaft 16. When shaft 16 is driven in the other direction, the selsyn receiver will be driven at a speed equal to the difference between the two signals applied to the differential 15. Thus, the shaft 16 may be turned in one direction to momentarily increase the speed of slave drum 25 and vary the spacial alignment between the drums 25 and 23 in one sense, and the shaft 16 may be rotated in the other direction to momentarily decrease the speed of rotation of drum 25 to vary the spacial alignment in the opposite sense.

The signals appearing on lines 35 and 37 are applied to a counter controller 39, the function of which is to apply signals to a stepping motor translator 43 for controlling the direction of rotation and the angle of rotation of shaft 16 in accordance with the deviation between a given predetermined time interval and the time interval between pulses applied to lines 35 and 37. When the time interval between pulses is less than the predetermined time interval, shaft 16 will be turned in one direction, and when it is greater than the predetermined time interval shaft 16 will be turned in the opposite direction.

As will be described below, within the counter controller 39 is an adjustment permitting adjustment of the relative desired time relationship between the pulses transmitted thereto on lines 35 and 37. This in turn determines the relative spacial relation of master drum 3 and slave drum 25.

The stepping motor translator 43 is of the type manufactured by Superior Electric Company, Model No. ST250B, and is connected to the stepping motor 19 by a four-wire cable 45. Pulses are applied to each pair of wires in sequence, the direction of rotating the motor depending on the particular sequence in which the pulses are applied to the pairs of wires. The direction of rotation manifestly is reversed by applying a signal on line 41 that will reverse the sequence in which pulses appear on the wire pairs.

The overall operation of the system described above is as follows. Assume that the master drum 3 and the slave drum 25 are initially randomly positioned and that drive motor 1 has been started to drive the two drums. Initially, the speed of rotation of slave drum 25 will be determined by the speed of drive motor 1 alone inasmuch as the selsyn differential output signal will be determined only by selsyn transmitter 11. Pulses will be transmitted to counter controller 39 through lines 35 and 37, but initially counter controller 39 is not activated. As soon as counter controller 39 is activated, the first pair of pulses received from lines 35 and 37 will actuate the counter controller to produce a plurality of pulses on line 42 to turn the stepping motor in a direction and through an angle determined by the sense and magnitude of the deviation of the time interval between the pulses from a desired time interval. The output of selsyn differential 15 will now be determined by the sum of the signals applied thereto from transmitter 11 and stepping motor 19 such that the speed of rotation of selsyn receiver 21, and thus drum 25, will be determined by the sum of the rotational speeds of transmitter 11 and stepping motor 19. The rotational speed of drum 25 will thus be increased or decreased so that pulses appearing on lines 35 and 37 will have the desired time relationship. This time relationship between the pulses, and hence the spacial relationship between the drums, will be maintained thereafter, even though the drums are stopped and subsequently started up again inasmuch as the output of the selsyn differential 15 is determined only by the signal received from transmitter 11.

Figure 2:
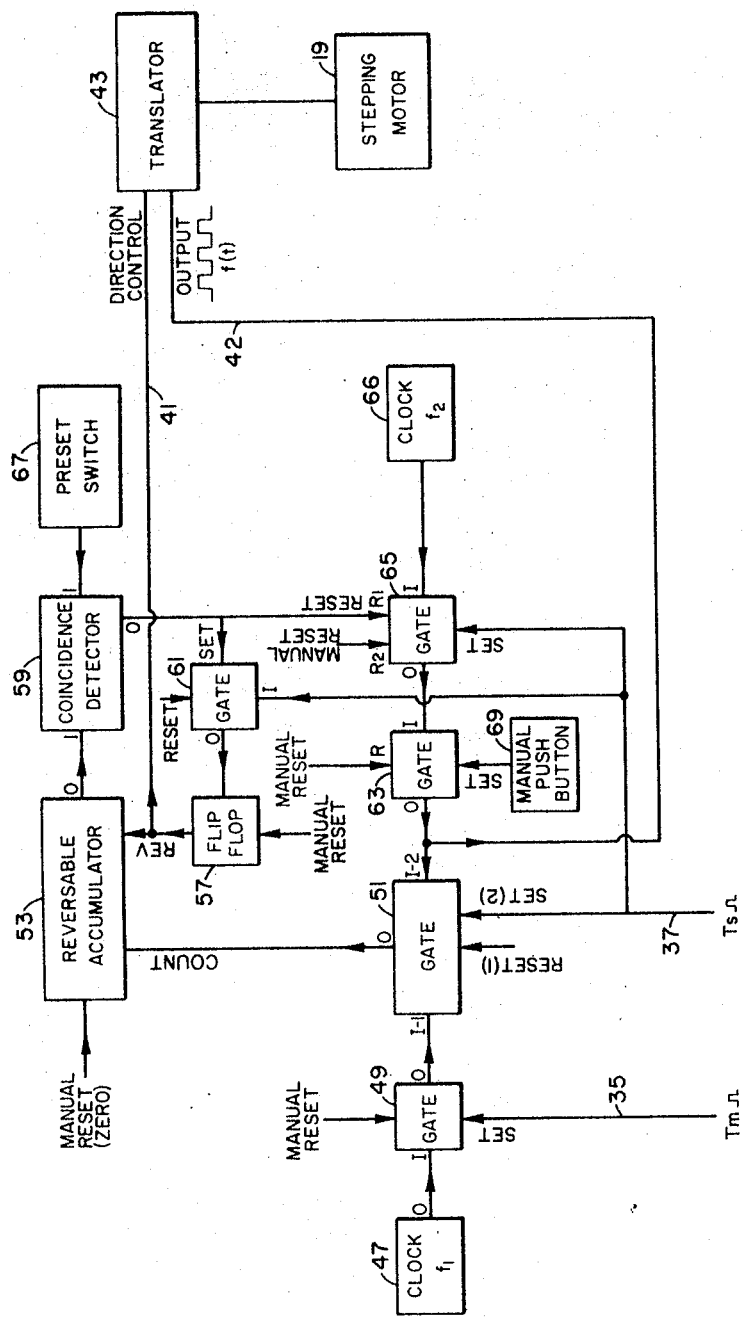
FIG. 2 is a schematic diagram showing in greater detail the counter controller, stepping motor translator, and stepping motor illustrated in FIG. 1.

The details of construction of counter controller 39 are illustrated by the block diagram of FIG. 2. Lines 35 and 37, translator 43, and stepping motor 19 are illustrated in FIG. 2 to provide a tie-in with FIG. 1. Two electronic clocks 47 and 66 are illustrated, although, in some instances, only one clock means need be provided. Preferably, clock 47 has a frequency of about 1000 pulses or cycles per second, and clock 66 has a frequency of about 200 pulses or cycles per second. The reason for this difference in frequency will become apparent below.

In the diagram, the letter O designates the output of a particular circuit element, the letter I designates the input to that element, the letter R designates a reset circuit for the element, and the letter S designates a set circuit for the element. This is in accordance with standard designation and will not be further discussed.

The output signal from clock 47 is applied to the input of a gate 49, the set circuit of which is connected to line 35. Line 37 is connected to set circuits of gates 51 and 65 and to an input circuit of gate 61. Signals from clock 47 passing through gate 49 are applied to one input circuit of gate 51, which, in effect, acts as a single pole, double throw switch and may be of the type manufactured by Beckman Instruments Inc. Model A115 of Counter 6014–1. The output circuit of gate 51 is applied to a reversible accumulator 53 which functions to produce an output signal indicative of the number of pulses received from gate 51. However, when a pulse is applied to the reversing or subtract circuit REV thereof, pulses received from gate 51 are subtracted from the total previously indicated. The output of reversible accumulator 53 is applied to one input circuit of a coincidence detector 59 which has two input circuits, the other input circuit of which is controlled by a preset switch 67. The coincidence detector 59 may be of the type manufactured by Beckman Instruments Inc., Model No. 887–426025, and the switch 67 may be of the type manufactured by Beckman Instruments Inc., Model No. 711–425917. The function of the coincidence detector and preset switch 67 is to produce an output pulse when the reversible accumulator 53 indicates an output count equal to a count previously determined by switch 67. In other words, when the two counts are equal, coincidence detector 59 will detect the equality and produce an output pulse which will be concomitantly applied to the set circuit of gate 61 and the reset circuit of gate 65. Gate 65 functions to gate the signals from clock 66 immediately after a pulse appears from line 37, which signals are passed through gate 63 to gate 51 and on to the reversible accumulator 53. The function of gate 63 is to provide a manual control from push-button 69 to permit a resetting of the stepping motor 19 after preset switch 67 has been readjusted to provide a different time relationship between the drums. Gate 61 functions to pass the pulse received from line 37 to actuate flip-flop 57 after a pulse has been received from coincidence detector 59 to produce an output pulse which is applied to the add or subtract circuit of the reversible accumulator, and also to the direction control line 41 of translator 43 to reverse the direction of rotation of stepping motor 19. All of the gate circuits, the flip-flop circuit 57, and the reversible accumulator 53 have manual reset circuits which are simultaneously reset by a common push-button switch (not shown). This switch functions to reset the accumulator to zero count and to reset the flip-flop 57 and the gates to an initial state thereof. The output of gate 63 is also connected to line 42 leading to translator 43. Pulses passed thereby from clock 66 actuate the translator. It is desirable to have the difference in frequency or pulse rates between the clocks because clock 47 must count in real time, whereas clock 66 must count at a sufficiently slow rate to accommodate to the relatively slow actuation speed of the stepping motor 19.

The overall operation of the circuit of FIG. 2 is as follows. Initially, manual push-button 69 is pressed to set gate 63. The pulse appearing on line 35 will set gate 49 to permit pulses from clock 47 to pass through gate 51 and to be accumulated by reversible accumulator 53. Assume the position of switch 67 is such that no coincidence between the count indicated by accumulator 53 and the count to which switch 67 is set is detected by detector 59. A pulse appearing on line 37 will open gate 65 and will set gate 51 so that pulses from clock 66 will now be counted by accumulator 53. When coincidence between the counts of accumulator 53 and switch 67 is detected by detector 59, an output pulse will be produced thereby to set gate 61 and close or reset gate 65. For reasons that will be apparent below, the setting of gate 61 at this point is of no consequence. When gate 65 was previously opened by pulses from line 37, the pulses from gate 66 were applied to the stepping motor 19 through translator 43. Closure of gate 65 will stop these pulses to stop the rotation of the stepping motor 19. The drums 3 and 25 will now be in their desired relative spacial positions.

Assume now that detector 59 indicates coincidence between the output of accumulator 53 and switch 67 before a pulse appears on line 37. An output pulse from detector 59 sets gate 61 so that when a pulse appears on line 37 the pulse will pass through gate 61 and will actuate flip-flop 57. This will act to reverse the accumulator 53 and to apply a signal to translator 43 that will reverse the direction of rotation of stepping motor 19 responsive to pulses received from clock 66 through gates 63 and 65. Accumulator 53 will reduce its output count until it is equal to the count to which switch 67 was previously set. At this point, coincidence detector 59 will produce another output pulse which will function to reset gate 65 and stop the passage of pulses from clock 66 to gate 51 and translator 43, thus stopping the pulse counting action of accumulator 53 and the rotation of motor 19. Drums 3 and 25 will now be in the desired relative spacial relationship. The aforementioned push-button or push-buttons (not shown) can now be actuated to reset the circuit elements to their initial states.

The use of reducing gear transmissions 5 and 23 greatly increases the angular accuracy of the system. The accuracy was improved from 30° to less than 0.2 of one degree by incorporating the transmissions in the drive of seismic recorder drums.

While the preferred embodiment of the invention in the present state of the art has been described, it is to be understood that the description is illustrative only and not to be taken in a limiting sense.

We claim:
1. In apparatus for producing and maintaining a desired spacial relationship between first and second members rotatively driven from a common prime mover, wherein one member is mechanically driven by the prime mover, the other member is driven by the prime mover through a selsyn generator, a selsyn receiver, and a differential connection connecting the generator to the receiver, the differential connection having a shaft such that the rotational speed of the receiver is the sum of the rotational speeds of the generator and of the input shaft, the improvement comprising:
   first means for producing a pulse at a given spacial position of the first driven member;
   second means for producing a pulse at a given spacial position of the second member; and
   third means connected to said first and second means for repositioning said shaft to produce a given time relationship between said pulses.

2. The apparatus of claim 1 wherein the prime mover is connected to the first member through a mechanical reducing gear transmission, and the selsyn receiver is connected to the other member through a second mechanical reducing gear transmission.

3. The apparatus of claim 1 wherein said third means includes a stepping motor for connection to said shaft, and actuating means for turning said motor in direction and angle to produce a given time relationship between said pulses.

4. The apparatus of claim 3 wherein said actuating means comprises fourth means having a control input circuit and direction input circuit connected to said stepping motor for stepping said motor through a given angle responsive to each pulse applied to said control input circuit thereof, and for reversing the direction of rotation responsive to a signal applied to said direction input circuit thereof; and fifth means connected to said first, second, and fourth means for producing a train of pulses in said control input circuit proportional to the difference between a predetermined time interval and the actual time interval between said pulses and for producing a pulse in said direction input circuit when said predetermined time interval is either greater or less than said actual time interval.

5. The apparatus of clam 4 wherein said fifth means comprises:
   clock means;
   first, second, and third gate means, each having a pulse input circuit connected to said clock means and a set circuit, the set circuit of the first gate means being connected to said first means, and the second circuit of said second gate means being connected to said second means;
   a reversible accumulator for counting pulses applied thereto and producing an output signal indicative of the number of pulses counted thereby, said accumulator being further adapted to subtract from the pulse count indicated thereby responsive to a subtract signal applied thereto;
   first circuit means connected to said accumulator and to said second and third gate means for producing an output pulse when the pulse count indicated by said accumulator is of predetermined magnitude to reset the second gate and set said third gate;
   fourth gate means connected to said second means and to said first and second gate means for normally conducting clock pulses from said first gate to said accumulator, and for conducting clock pulses from said second gate means to said accumulator responsive to a pulse from said second means;
   second circuit means connected to said fourth means to said translator and to said first circuit means to apply a reversing signal to said direction input circuit thereof and a subtract signal to said reversible accumulator responsive to an output pulse from said first circuit means followed by a pulse from said second means, said second gate means being connected to said fourth means to apply actuating pulses thereto from said clock means responsive to reception of a pulse from said second means.

6. The apparatus of claim 4 wherein said fifth means comprises:
   clock means for producing a pulse train;
   first gate means connected to said clock means and to said first means for gating clock signals responsive to a pulse from said first means;
   second gate means connected to said clock means and to said fourth means for gating pulses from said clock means to said fourth means for actuating said stepping motor; and
   control means connected to said first and second gate means to apply a number of pulses to said first means proportional to the differential time interval between a predetermined time interval and a time interval between said pulses produced by said first and second means, and to produce a reversing signal for said stepping motor when the actual time interval is less than the predetermined time interval.

References Cited
UNITED STATES PATENTS

| | | | |
|---|---|---|---|
| 2,795,748 | 6/1957 | Wellington et al. | 318—13 |
| 2,911,760 | 11/1959 | Barradell-Smith | 317—6 X |
| 3,030,564 | 4/1962 | Early et al. | 318—85 X |
| 3,364,404 | 1/1968 | Carlson | 318—8 X |
| 3,368,108 | 2/1968 | Helm | 317—6 |

ORIS L. RADER, Primary Examiner

A. G. COLLINS, Assistant Examiner

U.S. Cl. X.R.

318—72, 76